(12) United States Patent
Shahin

(10) Patent No.: US 12,553,484 B2
(45) Date of Patent: Feb. 17, 2026

(54) DRUM BRAKE

(71) Applicant: HL MANDO CORPORATION, Pyeongtaek (KR)

(72) Inventor: Hatem Shahin, Pfaffenhofen (DE)

(73) Assignee: HL MANDO CORPORATION, Pyeongtaek (KR)

( * ) Notice: Subject to any disclaimer, the term of this patent is extended or adjusted under 35 U.S.C. 154(b) by 232 days.

(21) Appl. No.: 18/185,457

(22) Filed: Mar. 17, 2023

(65) Prior Publication Data

US 2024/0026943 A1  Jan. 25, 2024

(30) Foreign Application Priority Data

Jul. 21, 2022  (KR) .......................... 10-2022-0090275

(51) Int. Cl.
| | |
|---|---|
| *F16D 65/62* | (2006.01) |
| *B60T 1/06* | (2006.01) |
| *F16D 51/20* | (2006.01) |
| *F16D 51/26* | (2006.01) |

(52) U.S. Cl.
CPC .............. *F16D 65/62* (2013.01); *B60T 1/067* (2013.01); *F16D 51/20* (2013.01); *F16D 51/26* (2013.01)

(58) Field of Classification Search
None
See application file for complete search history.

(56) References Cited

U.S. PATENT DOCUMENTS

| | | | | | |
|---|---|---|---|---|---|
| 1,978,699 | A | * | 10/1934 | Dodge ................... | F16D 65/091 188/79.63 |
| 1,996,248 | A | * | 4/1935 | La Brie ................... | F16D 65/48 188/332 |
| 2,095,753 | A | * | 10/1937 | La Brie ................... | F16D 65/46 188/332 |
| 2,119,384 | A | * | 5/1938 | Denham ................. | F16D 65/58 188/364 |
| 2,127,739 | A | * | 8/1938 | La Brie ................... | F16D 51/26 188/106 A |

(Continued)

FOREIGN PATENT DOCUMENTS

| | | |
|---|---|---|
| CN | 212297345 U | 1/2021 |
| DE | 1159219 B | 12/1963 |

(Continued)

OTHER PUBLICATIONS

DE OA dated Nov. 6, 2025.
KR OA dated Sep. 30, 2025.

*Primary Examiner* — Melanie Torres Williams
(74) *Attorney, Agent, or Firm* — Harvest IP Law, LLP

(57) ABSTRACT

A drum brake of a vehicle according to a present embodiment may include a pair of brake shoes disposed in a drum to be moved to an inner circumferential surface of a brake drum of the drum brake by a wheel cylinder, a backplate which is fixed to a vehicle body and to which each of the brake shoes is rotatably coupled, and a rotation unit configured to assist a restoring force of the brake shoe, wherein the rotation unit includes a moving pin fixed to a side surface of the brake shoe and formed to protrude toward the backplate, a rotation plate to which the moving pin is coupled to receive an external force in a moving direction of the moving pin, and an elastic part disposed between the rotation plate and the backplate to elastically support the rotation plate.

9 Claims, 6 Drawing Sheets

(56) References Cited

U.S. PATENT DOCUMENTS 5,275,260 A * 1/1994 Evans ................. F16D 65/08
                                                        188/79.64
2002/0092714 A1 * 7/2002 Asai ................... F16D 51/20
                                                        188/78

FOREIGN PATENT DOCUMENTS

| DE | 1193745 B | 5/1965 |
| EP | 0831241 A2 | 3/1998 |
| JP | 4875061 B | 2/2012 |
| KR | 10-2268683 B1 | 6/2021 |

* cited by examiner

DRUM BRAKE

CROSS-REFERENCE TO RELATED APPLICATION

This application claims the benefit of Korean Patent Application No. 10-2022-0090275, filed on Jul. 21, 2022 in the Korean Intellectual Property Office, the disclosure of which is incorporated herein by reference.

BACKGROUND

1. Field

Embodiments of the present disclosure relate to a drum brake of a vehicle, and more specifically, to a drum brake of a vehicle in which a device is provided so that a brake shoe maintains a constant distance from an inner circumferential surface of a brake drum before and after braking of the drum brake.

2. Description of the Related Art

In general, vehicles necessarily include brake systems for braking. A drum brake is one of such brake systems. The braking principle of the drum brake is to press a brake shoe, to which a lining (a friction material) is attached, against an inner circumferential surface of a brake drum which is positioned inside and rotates with wheels to generate a friction force and use the friction force as a braking force.

That is, when the vehicle performs braking, the brake shoe comes into contact with the inner circumferential surface of the brake drum, and when the vehicle performs traveling, components of the brake drum are driven to maintain a constant distance between the inner circumferential surface of the brake drum and the brake shoe.

However, due to the influence of a traveling direction, pressure applied to the brake drum and the brake shoe of the drum brake is asymmetrical. Accordingly, when the drum brake repeats braking and releasing braking of the vehicle, a problem that a distance between the brake shoe and the brake drum is not constant occurs. Conventionally, a return spring connecting a pair of brake shoes using an elastic part or other components for generating an external force inward have been further provided to solve such a problem.

Nevertheless, since the existing device for maintaining the distance between the brake shoe and the brake drum has a limitation, there are many disadvantages that the added components are complex, manufacturing costs are high, and the like, and thus a new method is required.

Related Art

Patent Document

Korean Patent Publication No. 10-2268683 (Registered on Jun. 17, 2021)

SUMMARY

Therefore, it is an aspect of the present disclosure to provide a drum brake in which a constant distance between a brake shoe and a brake drum is maintained by providing an external force in a direction of restoration of the brake shoe after braking of the drum brake of a vehicle.

It is another aspect of the present disclosure to provide a drum brake in which external forces applied to a pair of brake shoes are individually adjusted after braking of the drum brake of a vehicle.

It is still another aspect of the present disclosure to provide a drum brake in which a larger inner space is provided by minimizing a size of a component capable of maintaining a distance between a brake shoe and a brake drum after braking of the drum brake of a vehicle.

It is yet another aspect of the present disclosure to provide a drum brake of which manufacturing costs are reduced by simplifying a component capable of maintaining a distance between a brake shoe and a brake drum after braking of the drum brake of a vehicle.

In accordance with one aspect of the present disclosure, a drum brake of a vehicle includes a pair of brake shoes disposed in a drum to be moved to an inner circumferential surface of a brake drum of the drum brake by a wheel cylinder, a backplate which is fixed to a vehicle body and to which each of the brake shoes is rotatably coupled, and a rotation unit configured to assist a restoring force of the brake shoe, wherein the rotation unit includes a moving pin fixed to a side surface of the brake shoe and formed to protrude toward the backplate, a rotation plate to which the moving pin is coupled to receive an external force in a moving direction of the moving pin, and an elastic part disposed between the rotation plate and the backplate to elastically support the rotation plate.

The rotation plate may include a curved groove formed to be recessed in the rotation plate to accommodate the moving pin and curved along a part of a moving path along which the moving pin moves to guide a constant distance in which the moving pin moves.

The moving pin may be provided as a pair of moving pins facing each other in a horizontal direction on the side surface of each of the pair of brake shoes, and the curved groove may be provided as a pair of curved grooves facing each other in the horizontal direction on the rotation plate and formed to extend in moving directions of the moving pins.

The elastic part may be provided as a spiral torsion spring to provide a restoring force in a direction opposite to a rotating direction of the rotation plate when the rotation plate rotates.

The rotation plate may be coupled to the backplate while elastically supported by the elastic part, and a pivot pin may be provided in a center of the rotation plate to rotate the rotation plate.

The rotation unit may be provided as at least a pair of rotation units disposed left-right symmetrically on the backplate.

The rotation unit may include two pairs of rotation units in which one pair of the rotation units are disposed on a horizontal diameter crossing a center of the backplate and the other pair of rotation units are disposed close to a wheel cylinder provided in the backplate.

The rotation plate may include an insertion groove formed to be recessed in the rotation plate as much as a size of one end of the moving pin so that the one end of the moving pin is accommodated in and coupled to the insertion groove.

The rotation plate may have an oval phase having a long radius in a horizontal direction and a short radius in a vertical direction.

The drum brake may include a simplex brake type drum brake in which a single wheel cylinder is provided so that the pair of the brake shoes move in different directions during braking of the vehicle.

The drum brake may include a duplex brake type drum brake in which two wheel cylinders are provided so that the pair of brake shoes move in the same direction during braking of the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
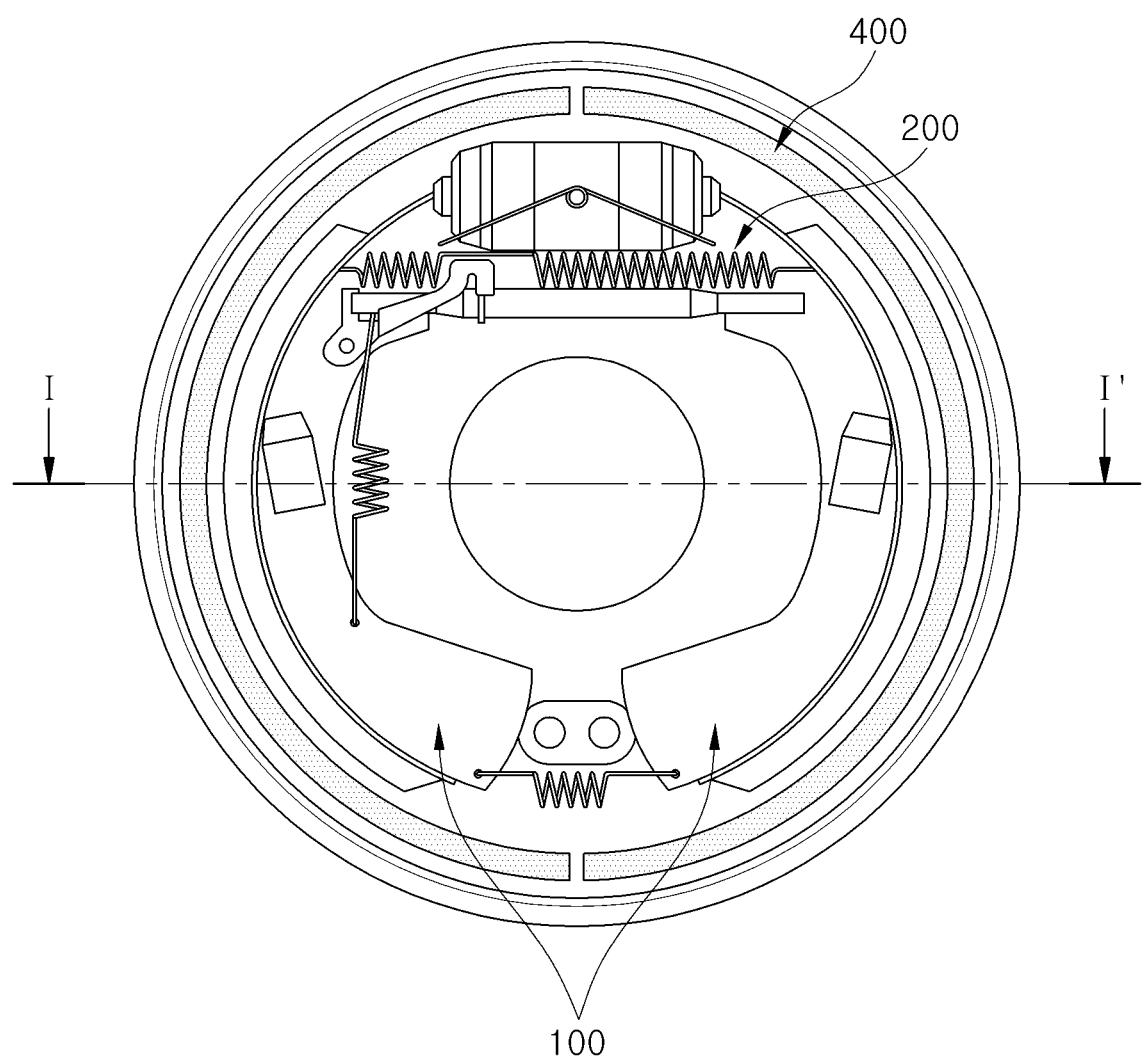
FIG. 1 is a front view illustrating an interior of a drum brake of a general vehicle.

Hereinafter, embodiments of the present disclosure will be described in detail with reference to the accompanying drawings. The following embodiments are provided to sufficiently convey the spirit of the present disclosure to those skilled in the art. The present disclosure is not limited to the embodiments disclosed herein and may be implemented in different forms. In the drawings, portions which are not related to the description may be omitted for clarifying the present disclosure, and sizes of components may be exaggerated for facilitating understanding of the present disclosure.

FIG. 1 is a front view illustrating an interior of a drum brake of a general vehicle. Referring to FIG. 1, in addition to an embodiment of the present disclosure, the drum brake of the general vehicle includes a pair of brake shoes 100 disposed in a brake drum and a wheel cylinder for moving each of the brake shoes 100 in a direction toward an inner circumferential surface of the brake drum. In addition, a backplate 200 which is fixed to a vehicle body and to which the brake shoe 100 is rotatably coupled and a return spring 400 for connecting the pair of the brake shoes 100 in the drum brake are provided. In this case, the wheel cylinder may be electronically or hydraulically driven and may be provided as one wheel cylinder or two wheel cylinders. In particular, a brake type in which one wheel cylinder is provided in a drum brake and the pair of brake shoes 100 move in different directions during braking of the vehicle is referred to as a simplex drum brake, and a brake type in which two wheel cylinders are provided and the pair of brake shoes 100 move in the same direction during braking of the vehicle is referred to as a duplex drum brake. The embodiment of the present disclosure is described with the simplex drum brake, but the present disclosure is not limited thereto and may also be similarly applied to the duplex drum brake. The embodiment of the present disclosure includes a rotation plate 320 provided to face the brake shoe 100 on the backplate 200 and a moving pin 310 provided to face the rotation plate 320 on a side surface of the brake shoe 100.

Figure 2:
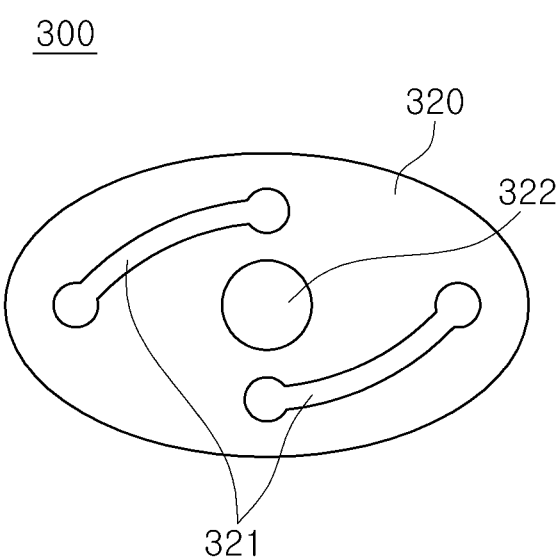
FIG. 2 is a front view illustrating a rotation unit of a drum brake of a vehicle according to a present embodiment.

FIG. 2 is a front view illustrating a rotation unit of a drum brake of a vehicle according to a present embodiment. The drum brake of the present disclosure includes a rotation unit 300 for assisting a restoring force of the brake shoe 100 after braking, and the rotation unit 300 includes a moving pin 310, the rotation plate 320, and an elastic part 330. Referring to FIG. 2, the rotation unit 300 of the present embodiment includes the rotation plate 320 and a curved groove 321 and further includes a pivot pin 322.

The rotation plate 320 is coupled to the moving pin 310 provided on the brake shoe 100 to receive an external force in a moving direction of the moving pin 310. The rotation plate 320 may be provided in an oval shape having a long radius in a horizontal direction and a short radius in a vertical direction. However, the rotation plate 320 is not limited to the specific shape and have any rotatable plate shape. The rotation plate 320 may include the pivot pin 322 which is a shaft of rotation on a center of the rotation plate 320. The pivot pin 322 helps stable rotation of the rotation plate 320 but does not need to be necessarily included in the rotation unit 300.

The curved groove 321 is formed to be recessed in the rotation plate 320 to accommodate the moving pin 310 and may be formed to be curved along a part of a moving path along which the moving pin 310 moves to guide a constant distance in which the moving pin 310 moves. During braking, since the brake shoe 100 moves at a smaller angle than 180 degrees, the curved groove 321 is provided within less than 180 degrees. The curved groove 321 may be provided as a pair of curved grooves 321 facing each other around the center of the rotation plate 320. In this case, instead of the curved groove 321, the rotation plate 320 may include an insertion groove (not shown) formed to be recessed as much as a size of one end of the moving pin 310 to accommodate the one end of the moving pin 310 in the rotation plate 320 to accommodate the moving pin 310. When the curved groove 321 is provided as a component for accommodating the moving pin 310, there are advantages that an unnecessary external force is not generated in a direction opposite to a moving direction of the brake shoe 100 when the brake shoe 100 moves toward the inner circumferential surface of the brake drum, and durability of the component is improved because pressure applied to the moving pin 310 and the curved groove 321 is low. On the other hand, when the insertion groove (not shown) is provided, there is an advantage that the rotation plate 320 is simply manufactured.

The rotation plate 320 of the drum brake of the vehicle according to the present embodiment has the oval shape in which the long radius in the horizontal direction is greater than the short radius in the vertical direction, the pivot pin 322 is provided on the center of the rotation plate 320, and the pair of curved grooves 321 are formed upward from left and downward from right to face each other with respect to a center of the oval shape. The curved groove 321 has a curvature along the oval shape of the rotation plate 320.

However, the shape of the rotation plate 320 and a length and the curvature of the curved groove 321 are not limited thereto illustrated in FIG. 2 and have any shape of the rotation plate 320 capable of rotating and accommodating the moving pin 310.

Figure 3:
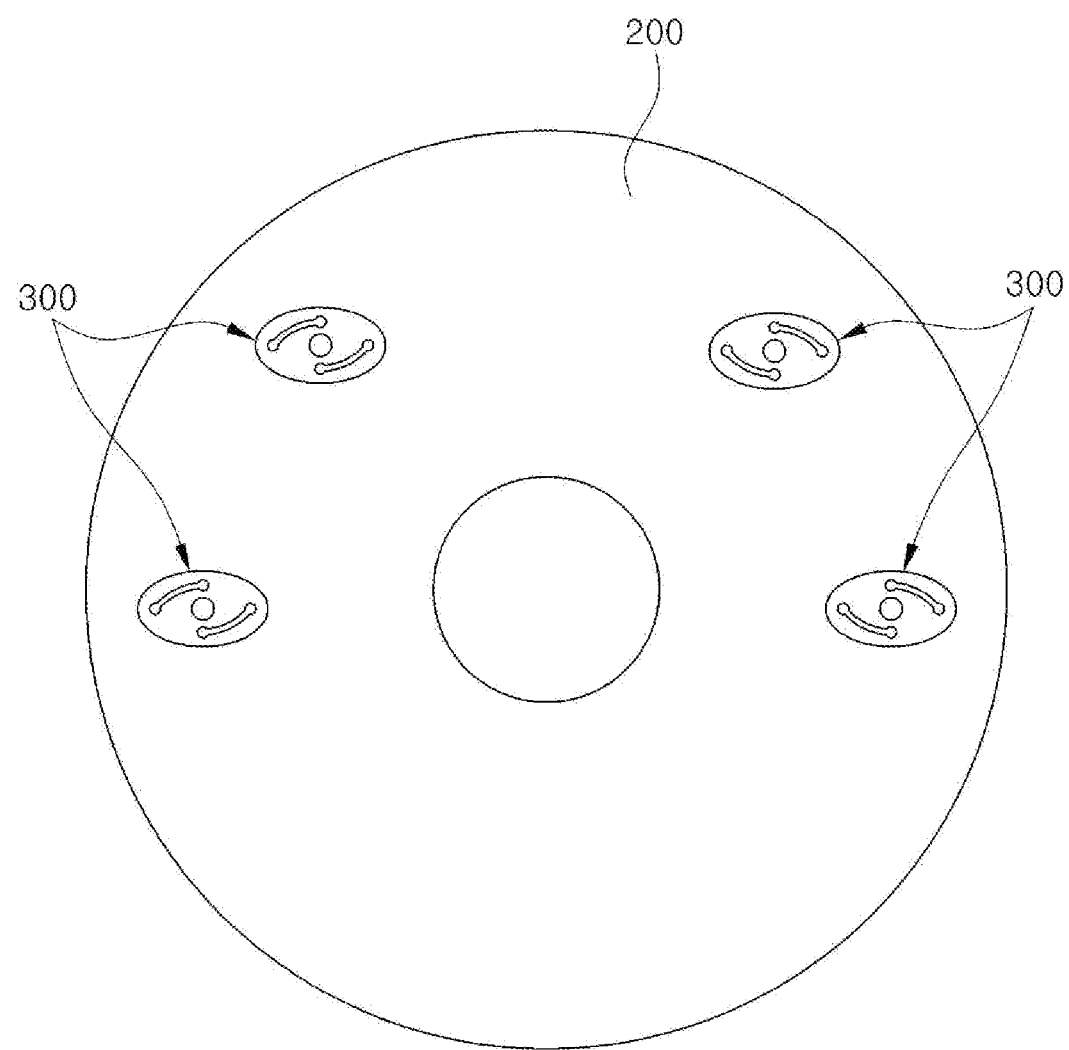
FIG. 3 is a front view illustrating a state of rotation units when the plurality of rotation units are provided on a backplate of the drum brake of the vehicle and a brake shoe maintains a constant distance from an inner circumferential surface of a brake drum before and after braking according to the present embodiment.
Figure 4:
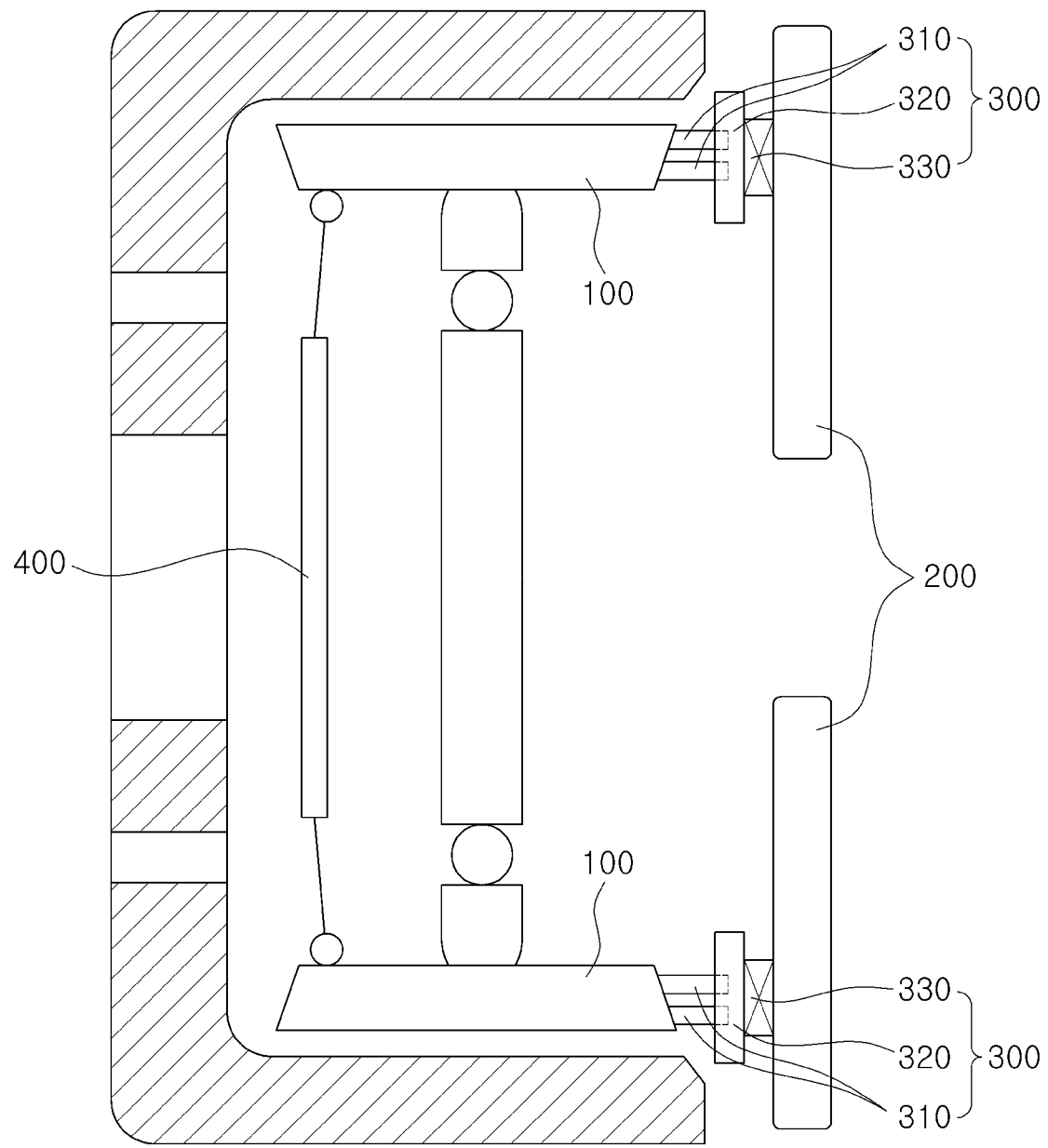
FIG. 4 is a cross-sectional view illustrating the drum brake along line I-I' of FIG. 1 when a constant distance between the brake shoe and the inner circumferential surface of the brake drum is maintained before and after braking of the drum brake of the vehicle according to the present embodiment.

FIG. 3 is a front view illustrating a state of rotation units 300 when the plurality of rotation units 300 are provided on the backplate 200 of the drum brake of the vehicle and a brake shoe 100 maintains a constant distance from the inner circumferential surface of the brake drum before and after braking according to the present embodiment, and FIG. 4 is a cross-sectional view illustrating the drum brake along line I-I' of FIG. 1 when a constant distance between the brake shoe 100 and the inner circumferential surface of the brake drum is maintained before and after braking of the drum brake of the vehicle according to the present embodiment. Referring to FIGS. 3 and 4, the rotation unit 300 of the drum brake of the vehicle of the present disclosure is provided as the plurality of rotation units 300 which each includes the elastic part 330. The moving pin 310 is provided on each of the pair of brake shoes 100.

The plurality of rotation units 300 may be symmetrically disposed left and right on the backplate 200, at least one pair of rotation units 300 may be provided, a pair of rotation units 300 may be disposed on a horizontal diameter crossing a center of the backplate 200, and the other pair of rotation units 300 may be disposed close to a wheel cylinder provided in the backplate 200. However, since pressure applied to the brake drum may be asymmetrical due to a driving direction, the plurality of rotation units 300 provided at left and right sides may also be asymmetrically disposed to compensate for the asymmetric pressure.

The elastic part 330 is disposed between the rotation plate 320 and the backplate 200 to elastically support the rotation plate 320. The elastic part 330 is provided as a spiral torsion spring to provide a restoring force in a direction opposite to a rotating direction of the rotation plate 320 when the rotation plate 320 rotates, and in this case, when the pivot pin 322 is provided on the center of the rotation plate 320, the elastic part 330 can stably support the rotation plate 320 in a state in which a center of rotation is provided.

The moving pin 310 is fixed to the side surface of the brake shoe 100 and formed to protrude toward the backplate 200. The moving pin 310 may be provided as a pair of moving pins 310 to horizontally face each other on the side surface of each of the pair of brake shoes 100. In this case, the pair of curved grooves 321 may be provided to face each other in the rotation plate 320 to accommodate the moving pins 310 on the rotation plate 320 and formed to extend in moving directions of the moving pins 310.

Four rotation units 300 of the drum brake of the vehicle according to the present embodiment are provided to be coupled to the backplate 200 and each includes the rotation plate 320 having the oval shape. Before and after braking of the vehicle, the pair of moving pins 310 provided on the brake shoe 100 are accommodated in the curved groove 321 provided on the long radius of the rotation plate 320. Accordingly, long radii of the rotation plates 320 of all the rotation units 300 are positioned in parallel in the horizontal direction. The elastic part 330 is provided between the rotation plate 320 and the backplate 200 so that the rotation plate 320 is elastically supported the elastic part 330 and the elastic part 330 is coupled to the backplate 200. The pivot pin 322 provided on the center of the rotation plate 320 is included in the elastic part 330. A return spring 400 is provided in an opposite side of the backplate 200. The return spring 400 may provide a restoring force to the brake shoe 100 together with the rotation unit 300, but the rotation unit 300 may also replace the return spring 400. However, the number and a layout of the rotation units 300 are not limited to FIGS. 3 and 4 and have any number and layout of the rotation units 300 capable of providing a restoring force to the brake shoes 100.

Figure 5:
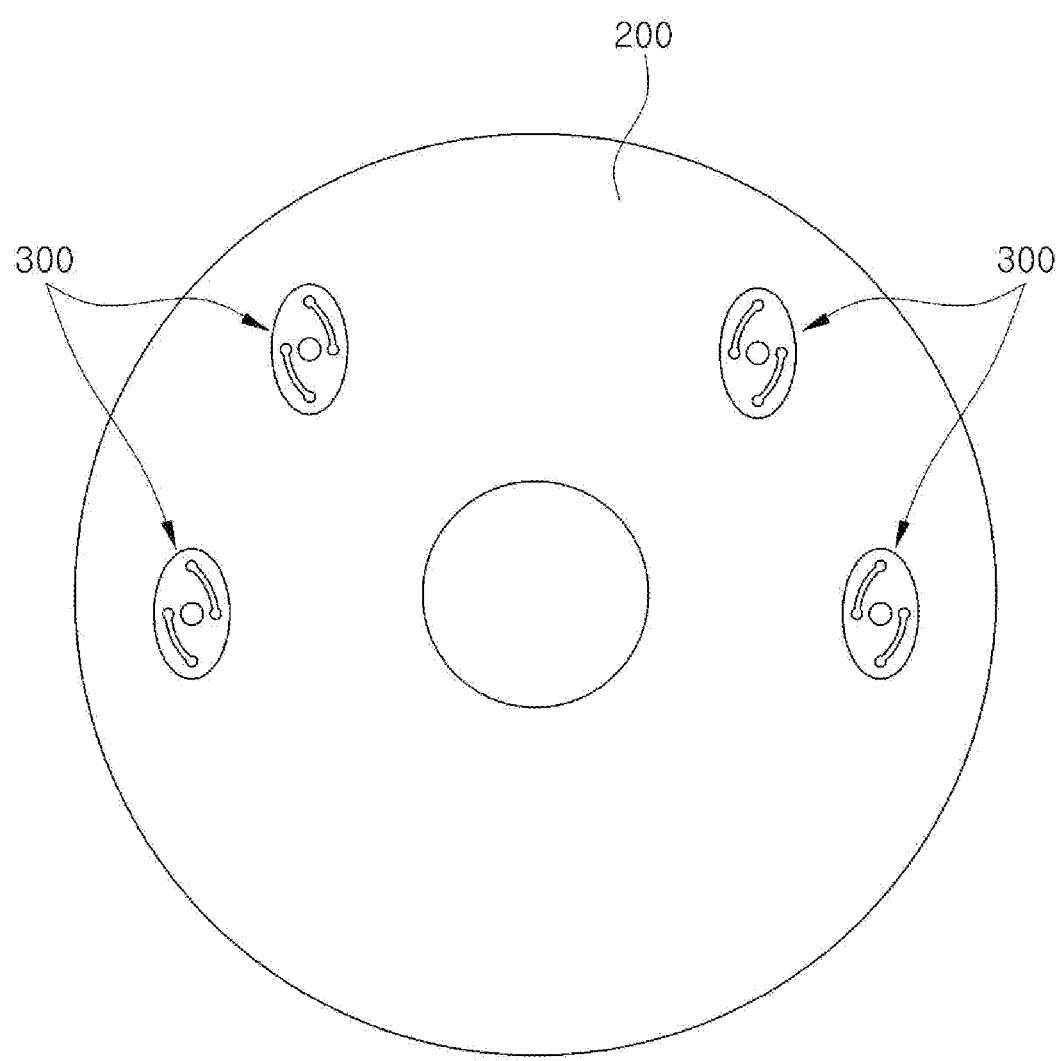
FIG. 5 is a front view illustrating a state of the rotation units when the plurality of rotation units are provided on the backplate of the drum brake of the vehicle and the brake shoe comes into contact with the inner circumferential surface of the brake drum during braking.
Figure 6:
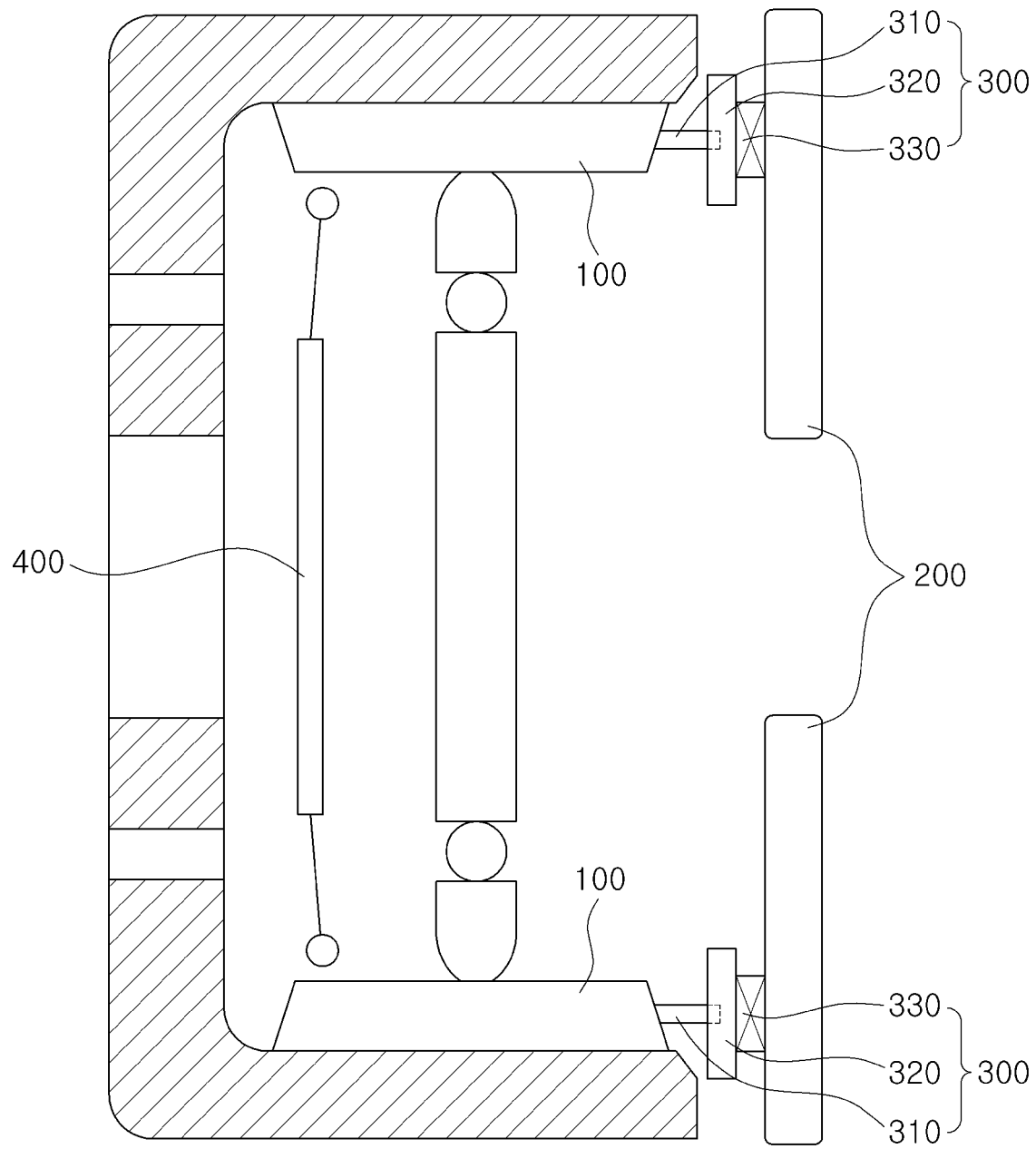
FIG. 6 is a cross-sectional view illustrating the drum brake along line I-I' of FIG. 1 when the brake shoe comes into contact with the inner circumferential surface of the brake drum during braking of the drum brake of the vehicle according to the present embodiment.

FIG. 5 is a front view illustrating a state of the rotation units 300 when the plurality of rotation units 300 are provided on the backplate 200 of the drum brake of the vehicle and the brake shoe 100 comes into contact with the inner circumferential surface of the brake drum during braking, and FIG. 6 is a cross-sectional view illustrating the drum brake along line I-I' of FIG. 1 when the brake shoe 100 comes into contact with the inner circumferential surface of the brake drum during braking of the drum brake of the vehicle according to the present embodiment. Referring to FIGS. 5 and 6, the layout of the rotation units 300 during braking of the vehicle may be seen.

In the rotation unit 300 of the drum brake of the vehicle according to the present embodiment, the moving pin 310 accommodated in the curved groove 321 provided on a long radius is rotated when braking of the vehicle starts. At first, the moving pin 310 moves along the curved groove 321, then, friction occurs between the accommodated one end of the moving pin 310 and the curved groove 321, and the rotation unit 300 begins to rotate so that the long radius faces in the vertical direction. When the brake shoe 100 completely moves and a friction pad of the brake shoe 100 comes into contact with the inner circumferential surface of the brake drum, the long radius of the rotation unit 300 faces in the vertical direction. In this case, in FIG. 6, since the moving pins 310 are positioned in parallel to each other and viewed to overlap each other, the moving pins 310 are viewed as if one moving pin 310 is provided on the center. When the braking of the vehicle is completed, the rotation units 300 rotate again in the states as illustrated in FIGS. 3 and 4.

The drum brake of the vehicle according to the present embodiment having such a configuration includes the rotation unit 300 including the moving pin 310, the rotation plate 320, and the elastic part 330 to provide an external force to the brake shoe 100 in a direction of restoration after braking of the brake, and thus a constant distance between the brake shoe 100 and the brake drum can be maintained. In addition, since the plurality of rotation units 300 can be provided, external forces applied to the pair of brake shoes 100 can be individually adjusted. Since the rotation unit 300 is provided between the backplate 200 and the brake shoe 100 of the drum brake to have a minimum size to replace the conventional component for maintaining a distance between the brake shoe 100 and the brake drum, a larger inner space of the drum brake can be secured, and manufacturing costs can also be reduced by replacing the complex component. Accordingly, the marketability of the drum brake can be naturally improved.

As is apparent from the above description, according to the present embodiment, a constant distance between a brake shoe and a brake drum is maintained by providing an external force in a direction of restoration of the brake shoe after braking of a drum brake of a vehicle.

According to the present embodiment, external forces applied to a pair of brake shoes are individually adjusted after braking of a drum brake of a vehicle.

According to the present embodiment, a larger inner space is provided by minimizing a size of a component capable of maintaining a distance between a brake shoe and a brake drum after braking of a drum brake of a vehicle.

According to the present embodiment, manufacturing costs are reduced by simplifying a component capable of maintaining a distance between a brake shoe and a brake drum after braking of a drum brake of a vehicle.

What is claimed is:

1. A drum brake of a vehicle, comprising:
a pair of brake shoes disposed in a drum to be moved to an inner circumferential surface of a brake drum of the drum brake by a wheel cylinder;
a backplate which is fixed to a vehicle body and to which each of the brake shoes is rotatably coupled; and
a rotation unit configured to assist a restoring force of the brake shoe,
wherein the rotation unit includes a moving pin fixed to a side surface of the brake shoe and formed to protrude toward the backplate, a rotation plate to which the moving pin is coupled to receive an external force in a moving direction of the moving pin, and an elastic part disposed between the rotation plate and the backplate to elastically support the rotation plate,
wherein the rotation plate includes a curved groove formed to be recessed in the rotation plate to accommodate the moving pin and curved along a part of a moving path along which the moving pin moves to guide a constant distance in which the moving pin moves.

2. The drum brake of claim 1, wherein:
the moving pin is provided as a pair of moving pins facing each other in a horizontal direction on the side surface of each of the pair of brake shoes; and
the curved groove is provided as a pair of curved grooves facing each other in the horizontal direction on the rotation plate and formed to extend in moving directions of the moving pins.

3. The drum brake of claim 1, wherein the rotation plate includes an insertion groove formed to be recessed in the rotation plate as much as a size of one end of the moving pin so that the one end of the moving pin is accommodated in and coupled to the insertion groove.

4. The drum brake of claim 1, comprising a simplex brake type drum brake in which a single wheel cylinder is provided so that the pair of the brake shoes move in different directions during braking of the vehicle.

5. The drum brake of claim 1, comprising a duplex brake type drum brake in which two wheel cylinders are provided so that the pair of brake shoes move in the same direction during braking of the vehicle.

6. A drum brake of a vehicle, comprising
a pair of brake shoes disposed in a drum to be moved to an inner circumferential surface of a brake drum of the drum brake by a wheel cylinder;
a backplate which is fixed to a vehicle body and to which each of the brake shoes is rotatably coupled; and
a rotation unit configured to assist a restoring force of the brake shoe,
wherein the rotation unit includes a moving pin fixed to a side surface of the brake shoe and formed to protrude toward the backplate, a rotation plate to which the moving pin is coupled to receive an external force in a moving direction of the moving pin, and an elastic part disposed between the rotation plate and the backplate to elastically support the rotation plate,
wherein the elastic part is provided as a spiral torsion spring to provide a restoring force in a direction opposite to a rotating direction of the rotation plate when the rotation plate rotates.

7. A drum brake of a vehicle, comprising:
a pair of brake shoes disposed in a drum to be moved to an inner circumferential surface of a brake drum of the drum brake by a wheel cylinder;
a backplate which is fixed to a vehicle body and to which each of the brake shoes is rotatably coupled; and
a rotation unit configured to assist a restoring force of the brake shoe,
wherein the rotation unit includes a moving pin fixed to a side surface of the brake shoe and formed to protrude toward the backplate, a rotation plate to which the moving pin is coupled to receive an external force in a moving direction of the moving pin, and an elastic part disposed between the rotation plate and the backplate to elastically support the rotation plate,
wherein the rotation plate is coupled to the backplate while elastically supported by the elastic part,
wherein a pivot pin is provided in a center of the rotation plate to rotate the rotation plate.

8. A drum brake of a vehicle comprising:
a pair of brake shoes disposed in a drum to be moved to an inner circumferential surface of a brake drum of the drum brake by a wheel cylinder;
a backplate which is fixed to a vehicle body and to which each of the brake shoes is rotatably coupled; and
a rotation unit configured to assist a restoring force of the brake shoe,
wherein the rotation unit includes a moving pin fixed to a side surface of the brake shoe and formed to protrude toward the backplate, a rotation plate to which the moving pin is coupled to receive an external force in a moving direction of the moving pin, and an elastic part disposed between the rotation plate and the backplate to elastically support the rotation plate,
wherein the rotation unit is provided as at least a pair of rotation units disposed left-right symmetrically on the backplate,
wherein the rotation unit includes two pairs of rotation units in which one pair of the rotation units are disposed on a horizontal diameter crossing a center of the backplate and the other pair of rotation units are disposed close to a wheel cylinder provided in the backplate.

9. A drum brake of a vehicle, comprising:
a pair of brake shoes disposed in a drum to be moved to an inner circumferential surface of a brake drum of the drum brake by a wheel cylinder;
a backplate which is fixed to a vehicle body and to which each of the brake shoes is rotatably coupled; and
a rotation unit configured to assist a restoring force of the brake shoe,
wherein the rotation unit includes a moving pin fixed to a side surface of the brake shoe and formed to protrude toward the backplate, a rotation plate to which the moving pin is coupled to receive an external force in a moving direction of the moving pin, and an elastic part disposed between the rotation plate and the backplate to elastically support the rotation plate,
wherein the rotation plate has an oval phase having a long radius in a horizontal direction and a short radius in a vertical direction.

* * * * *